United States Patent
Huang et al.

(10) Patent No.: US 10,151,339 B2
(45) Date of Patent: Dec. 11, 2018

(54) CABLE LENGTH AUTOMATIC ADJUSTMENT DEVICE FOR VEHICLE WINDOW LIFTER

(71) Applicants: HSIN CHONG MACHINERY WORKS CO. LTD., New Taipei (TW); FUZHOU MINGFANG AUTOMOBILE PARTS INDUSTRY CO., LTD., Fuzhou (CN); Francisco Javier Martinez Moral, Madrid (ES)

(72) Inventors: Chi-Ming Huang, New Taipei (TW); Kuang-Yu Chiang, New Taipei (TW)

(73) Assignees: HSIN CHONG MACHINERY WORKS CO. LTD., New Taipei (TW); FUZHOU MINGFANG AUTOMOBILE PARTS INDUSTRY CO., LTD., Madrid (ES); Francisco Javier Martinez Moral, Madrid (ES)

( * ) Notice: Subject to any disclaimer, the term of this patent is extended or adjusted under 35 U.S.C. 154(b) by 0 days.

(21) Appl. No.: 15/594,810

(22) Filed: May 15, 2017

(65) Prior Publication Data

US 2018/0328400 A1  Nov. 15, 2018

(51) Int. Cl.
| | | |
|---|---|---|
| F16C 1/22 | (2006.01) |
| E05F 11/48 | (2006.01) |
| F16C 1/26 | (2006.01) |
| B60J 1/08 | (2006.01) |
| B60J 1/17 | (2006.01) |

(Continued)

(52) U.S. Cl.
CPC .............. *F16C 1/22* (2013.01); *E05F 11/483* (2013.01); *F16C 1/262* (2013.01); *B60J 1/08* (2013.01); *B60J 1/12* (2013.01); *B60J 1/16* (2013.01); *B60J 1/17* (2013.01); *E05F 11/38* (2013.01); *E05F 11/48* (2013.01); *E05F 11/481* (2013.01); *E05Y 2900/55* (2013.01); *F16C 1/10* (2013.01); *F16C 1/26* (2013.01)

(58) Field of Classification Search
CPC .. F16C 1/22; F16C 1/223; F16C 1/226; F16C 1/262; E05F 11/483; E05F 11/38; E05F 11/48; E05F 11/481; B60J 1/08; B60J 1/12; B60J 1/16

See application file for complete search history.

(56) References Cited

U.S. PATENT DOCUMENTS

| | | | | |
|---|---|---|---|---|
| 4,344,518 A | * | 8/1982 | Gilmore ................. | F16C 1/226 192/111.12 |
| 4,598,809 A | * | 7/1986 | Glover .................... | F16C 1/22 188/196 B |

* cited by examiner

*Primary Examiner* — Thomas C Diaz
(74) *Attorney, Agent, or Firm* — Chun-Ming Shih; HDLS IPR Services

(57) ABSTRACT

A cable length automatic adjustment device for a vehicle window lifter includes a housing (1) having a hollow internal, a cable axial shaft (2) arranged inside the housing (1) and an adjusting member (3). The cable axial shaft (2) includes an axle base (20), an axial shaft (21) extended from the axle base (20) and a first elastic member (22) abutted between the axle base (20) and an inner wall of the housing (1). The adjusting member (3) includes a slotted base (30), positioning pieces (32) moveably attached onto the slotted base (30) and a second elastic member (33) abutted between the axle base (20) and the positioning pieces (32). The axial shaft (21) includes indented positioning portions (210), and the positioning pieces (32) include corresponding engagement portions (320). The positioning pieces (32) are clamped onto the positioning portions (210) of the axial shaft (21) with the engagement portions (320).

10 Claims, 5 Drawing Sheets

(51) Int. Cl.
*B60J 1/12* (2006.01)
*B60J 1/16* (2006.01)
*E05F 11/38* (2006.01)
*F16C 1/10* (2006.01)

CABLE LENGTH AUTOMATIC ADJUSTMENT DEVICE FOR VEHICLE WINDOW LIFTER

BACKGROUND OF THE INVENTION

Field of the Invention

The present invention is related to a vehicle accessory, in particular, to a cable length automatic adjustment device for a vehicle window lifter.

Description of Related Art

Currently, most vehicle windows in the market use a lifter to control the cable for adjusting the opening and closing of window glass. In addition, since vehicle window lifters are preset with the cables under tensioned state by factory default to allow the window glasses to be adjusted at opening or closing heights desired by the user, consequently, the cables tend to become overly loose due to actuations and wears of components after a long period of use. In addition, further uses of such loose cables can lead to unfavorable vibrations, inclinations or actuation abnormally sounds of the vehicle windows during the adjustments thereof.

In view of the above, to achieve the objective, the inventor seeks to provide a reasonable design capable of effectively improving the aforementioned drawbacks after years of researches along with utilization of academic theories and principles.

SUMMARY OF THE INVENTION

A primary objective of the present invention is to provide a cable length automatic adjustment device for a vehicle window lifter, which is able to automatically adjust the cable length of the lifter depending upon the wear conditions of components after a period of use of the lifter in order to maintain the vehicle window at a relatively stable state during the adjustment and to provide smooth actuation thereof.

To achieve the aforementioned objective, the present invention provides a cable length automatic adjustment device for a vehicle window lifter comprising a housing having a hollow internal; a cable axial shaft arranged inside the housing and having an axle base, an axial shaft extended from the axle base and a first elastic member abutted between the axle base and an inner wall of the housing; and an adjusting member arranged inside the housing and having a slotted base, a plurality of positioning pieces moveably attached onto the slotted base and a second elastic member abutted between the axle base and the plurality of positioning pieces; wherein the axial shaft include a plurality of indented positioning portions formed thereon, and the plurality of positioning pieces include engagement portions formed thereon corresponding to the indented positioning portions; the plurality positioning pieces are clamped onto the plurality of positioning portions of the axial shaft with the engagement portions.

DETAILED DESCRIPTION OF THE INVENTION

The following provide a detailed description on the technical content of the present invention along with the accompanied drawings. However, it shall be understood that the drawings are provided for illustration purposes only rather than to limit the scope of the present invention.

Figure 1:
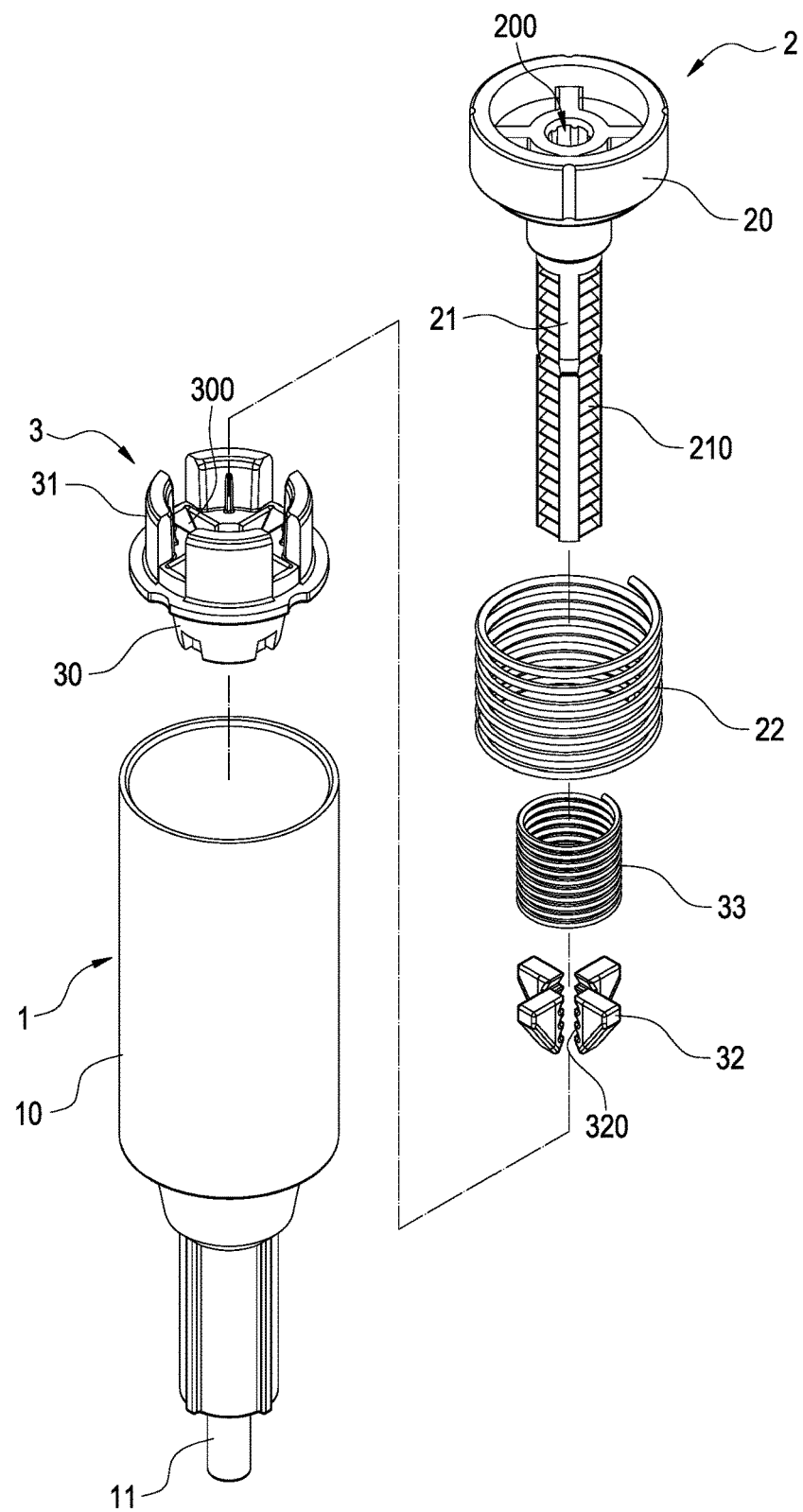
FIG. 1 is an exploded perspective view of the present invention.
Figure 2:
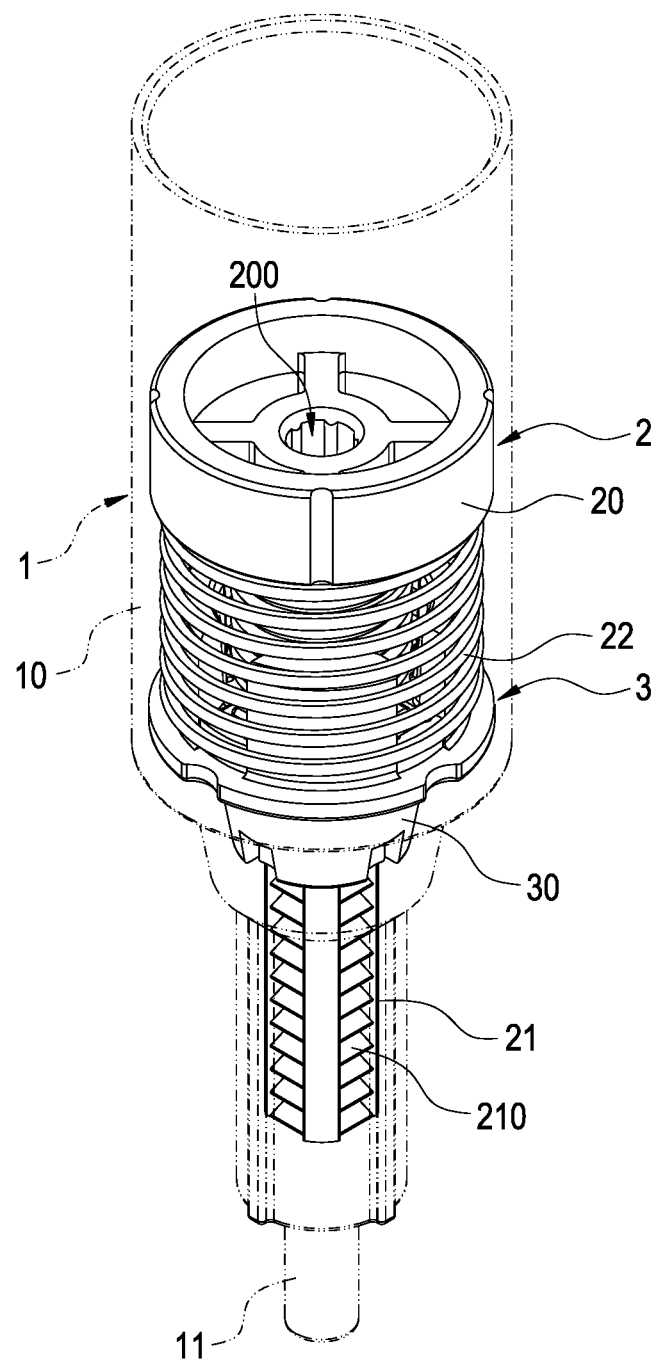
FIG. 2 is an assembly perspective view of the present invention.
Figure 3:
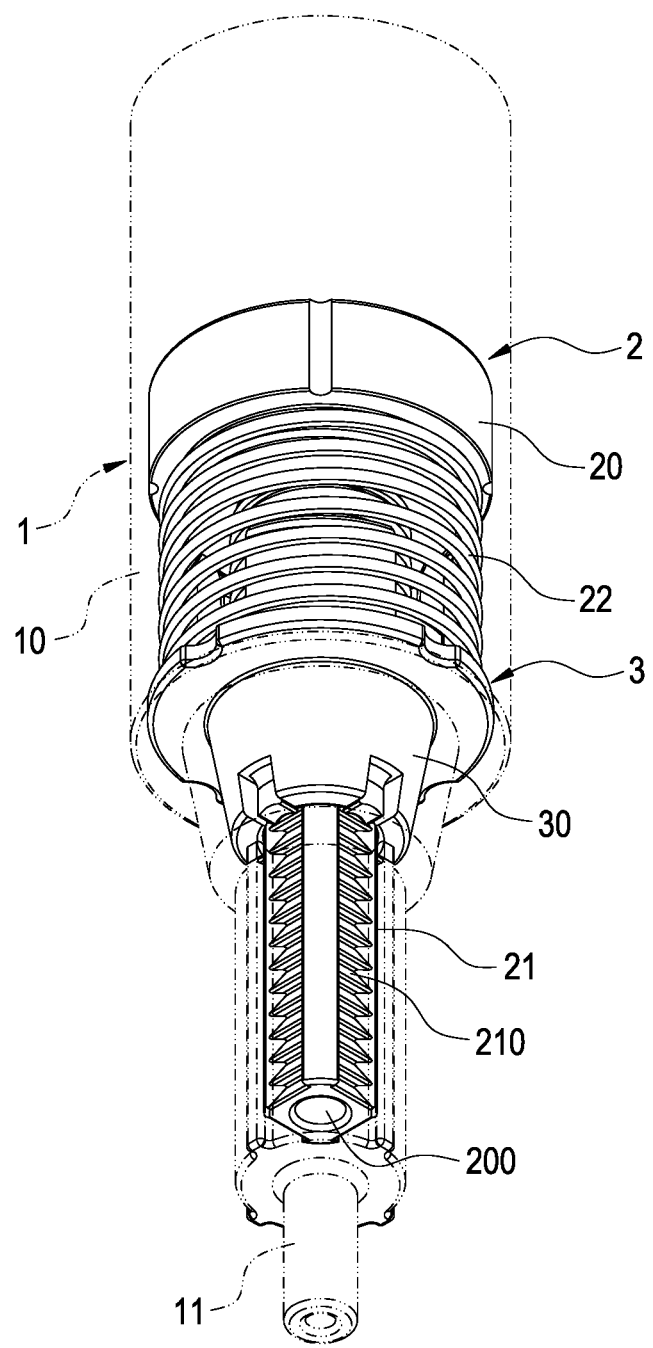
FIG. 3 is another assembly perspective view the present invention viewed from another angle.

Please refer to FIG. 1, FIG. 2, and FIG. 3, showing an exploded view, an assembly perspective view and another assembly perspective view of the present invention respectively. The present invention provides a cable length automatic adjustment device for a vehicle window lifter comprising a housing 1, a cable axial shaft 2 penetrating into the housing 1 and an adjusting member 2 arranged inside the housing 1 and actuated cooperatively with the cable axial shaft 2.

Figure 4:
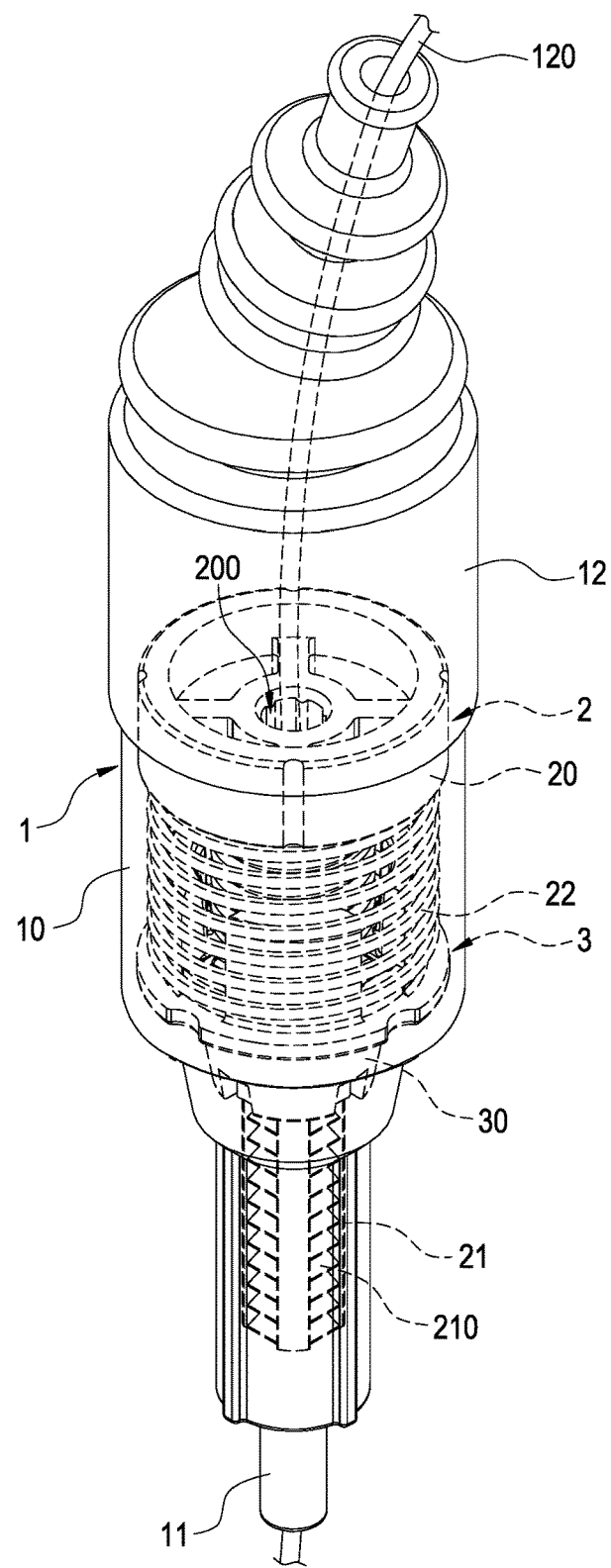
FIG. 4 is an assembly perspective view of the present invention provided for a cable to penetrate therein.
Figure 5:
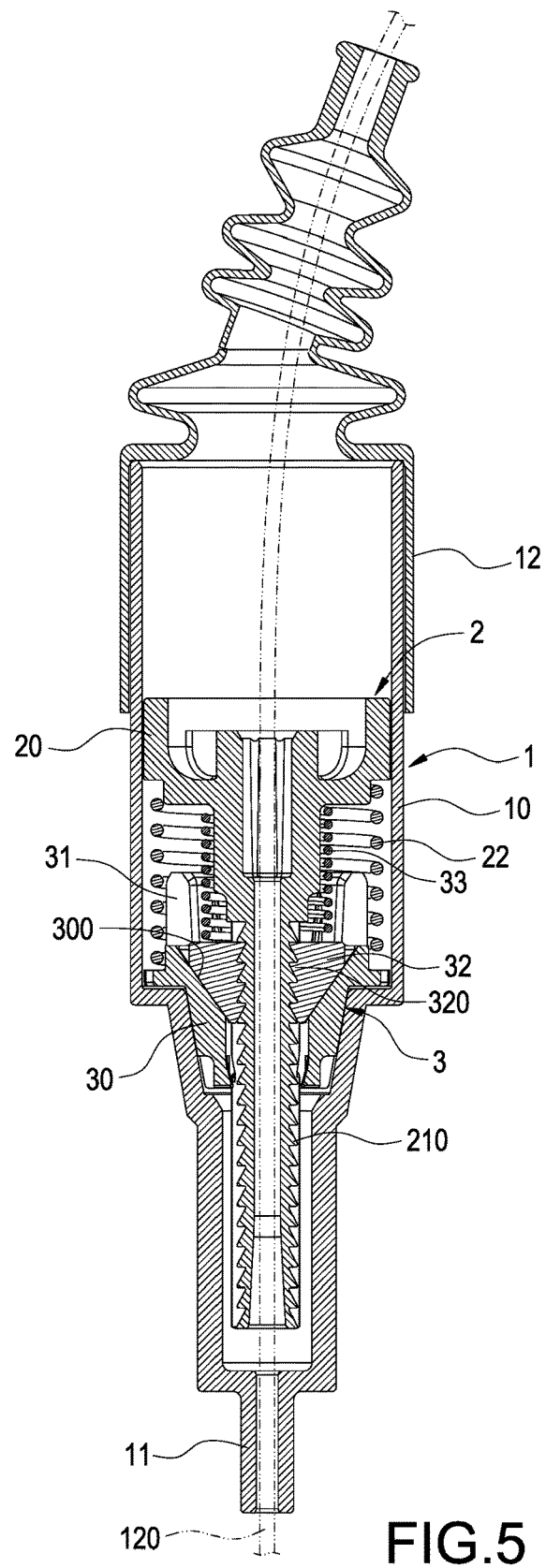
FIG. 5 is an assembly cross-sectional view of the present invention provided for a cable to penetrate therein.

The housing 1 mainly includes a housing body 10 with a hollow internal and a cable exit end 11 extended from one end of the housing body 10, and it is provided for the aforementioned cable axial shaft 2 and the adjusting member 3 to be arranged inside the housing body 10, followed by using an axle sleeve 12 (as shown in FIG. 4 or FIG. 5) to mount onto another end of the housing body 10. In addition, the axle sleeve 12 is provided to allow a cable 120 to penetrate into the housing 1 and to extend out from the cable exit end 11 via the aforementioned cable axial shaft 2.

The cable axial shaft 2 is arranged inside the aforementioned housing body 10 and includes an axle base 20, an axial shaft 21 extended from the axle base 20 and a first elastic member 22; wherein the first elastic member 22 is abutted between the axle base 20 and an inner wall of the housing body 10 in order to push the cable axial shaft 2 toward another end of the housing body 10. Furthermore, the axial shaft 21 extends from one end surface of the axle base 20 and penetrates into a cable insertion hole 200 at the centers of the axle base 20 and the axial shaft 21 such that after the aforementioned cable 120 penetrates through the cable insertion hole 200, it is tensioned inside the cable axial shaft 2.

The adjusting member 3 is also arranged inside the housing body 10 and is positioned between the axle base 20 of the cable axial shaft 2 and the cable exit end 11 of the housing 1. In addition, in the exemplary embodiments of the present invention, the adjusting member 3 includes a slotted base 30, a mounting ring 31 provided for one end of the first elastic member 22 to be mounted thereon, a plurality of positioning pieces 32 moveably attached onto the slotted base 30 and a second elastic member 33 arranged between the axle base 20 and the slotted base 30. The second elastic member 33 is abutted between the axle base 20 and the positioning pieces 32 in order to cooperate with the first elastic member 22 to tension the cable 120 inside the cable axial shaft 2 such that the cable 120 is constantly pulled under a tensioned state. The first and second elastic members 22, 33 can both be compression springs.

The main features of the present invention rely at least in that the slotted base 30 of the aforementioned adjusting member 3 includes a plurality of the positioning pieces 32 formed thereon, and each one of the positioning pieces 32 is clamped onto the axial shaft 21 of the cable axial shaft 2. In addition, the axial shaft 21 includes a plurality of indented positioning portions 210 formed thereon, and the plurality of positioning pieces 32 include engagement portions 320 formed thereon corresponding to the indented positioning portions 210; wherein the positioning portions 210 and the engagement portions 320 are of gear teeth shapes engaged with each other correspondingly in order to allow the positioning pieces 32 to be engaged onto the positioning portion 210 via the engagement portions 320 such that the cable axial shaft 20 is able to constantly pull the cable 120 to maintain it under a tensioned state.

Accordingly, with the aforementioned structural assembly, the cable length automatic adjustment device for a vehicle window lifter can be achieved.

Furthermore, as shown in FIG. 5, during the use of the lifter, the first elastic member 22 pushes the cable axial shaft 2 toward the direction of the axle base 12, and the second elastic member 33 exerts a force on each one of the positioning pieces 32 in order to allow each positioning piece 32 to attach onto the slotted base 30. In the event where the lifter is moved upward and downward for a long period of time, due to the wear outs of the components, the cable 120 tends to become overly loose and is of a length longer than the factory default length, especially when the increased amount of length of the cable 120 is greater than a gear separation distance or a gear pitch of the positioning portions 210 on the axial shaft 21, the axial shaft 21 then moves toward the direction of the axle sleeve 12 by a distance relative to the gear pitch of the positioning pieces 32 such that the length of the cable 120 can be automatically adjusted. To be more specific, the slotted base 30 can include a plurality of sliding slots 300 of a relative quantity and each one of the positioning pieces 32 is arranged inside the sliding slots 300 respectively. Moreover, the sliding slots 300 and the positioning pieces 32 are engaged with each other with oblique surfaces in order to allow the positioning pieces 32 are always attached onto the slotted base 30 at all time.

Therefore, the cable length automatic adjustment device for a vehicle window lifter provides an improvement to the drawback of known arts where the cable length cannot be adjusted automatically after a long period of actuation and uses of the lifter. The present invention is able to automatically adjust the cable length of the lifter based on the amount of wear outs of the components in order to maintain the vehicle window at a relatively stable state and to provide smooth actuations thereof. Accordingly, the issues of wobbling, inclination and abnormal sounds of windows actuated by traditional lifters can be overcome.

In view of the above, the present invention is able to achieve the expected objectives and overcome the drawbacks of known arts, which is of novelty and inventive step to comply with the patentability for patents. The present invention is, therefore, applied in accordance with the Patent Act in light of the grant of the patent right and the protection of the interest of the inventor.

In addition, the above description is to illustrate the exemplary embodiments of the present invention only, which shall not be treated as limitations to the claims of the present invention, and other equivalent modifications utilizing the spirit of the patent of the present invention shall all be deemed to be within the scope of the claims of the present invention.

What is claimed is:

1. A cable length automatic adjustment device for a vehicle window lifter, comprising:
    a housing (1) having a hollow internal;
    a cable axial shaft (2) arranged inside the housing (1) and having an axle base (20), an axial shaft (21) extended from the axle base (20);
    a first elastic member (22) positioned inside the housing (1) to abut the axle base (20); and
    an adjusting member (3) arranged inside the housing (1) and having a slotted base (30), a plurality of positioning pieces (32) moveably attached onto the slotted base (30) and a second elastic member (33) abutted between the axle base (20) and the plurality of positioning pieces (32);
    wherein the axial shaft (21) includes a plurality of indented positioning portions (210) formed thereon, and the plurality of positioning pieces (32) include engagement portions (320) formed thereon corresponding to the indented positioning portions (210); the plurality positioning pieces (32) are clamped onto the plurality of positioning portions (210) of the axial shaft (21) with the engagement portions (320).

2. The cable length automatic adjustment device for a vehicle window lifter, according to claim 1, wherein the adjusting member (3) further includes a mounting ring (31), and one end of the first elastic member (22) is mounted onto the mounting ring (31).

3. The cable length automatic adjustment device for a vehicle window lifter, according to claim 1, wherein the first elastic member (22) is a compression spring.

4. The cable length automatic adjustment device for a vehicle window lifter, according to claim 3, wherein the second elastic member (33) is a compression spring.

5. The cable length automatic adjustment device for a vehicle window lifter, according to claim 1, wherein the positioning portions (210) are of gear teeth shapes.

6. The cable length automatic adjustment device for a vehicle window lifter, according to claim 5, wherein the engagement portions (320) are of gear teeth shapes corresponding to the plurality of positioning portions (210) for engagement with each other.

7. The cable length automatic adjustment device for a vehicle window lifter, according to claim 1, wherein the housing (1) includes a housing body (10) and a cable exit end (11) extended from one end of the housing body (10).

8. The cable length automatic adjustment device for a vehicle window lifter, according to claim 7, wherein another end of the housing body (10) is mounted with an axle sleeve (12).

9. The cable length automatic adjustment device for a vehicle window lifter, according to claim 8, wherein the axle sleeve (12) includes a cable (120) penetrating through the housing (1) and extending out of the cable exit end (11) via the cable axial shaft (2).

10. The cable length automatic adjustment device for a vehicle window lifter, according to claim 9, wherein the axial shaft (2) extends from one end of the axle base (20) and penetrating into a cable insertion hole (200) at centers of the axle base (20) and the axial shaft (21), and the cable (120) penetrates through the cable insertion hole (200).

* * * * *